(12) United States Patent
Yang et al.

(10) Patent No.: US 12,087,285 B2
(45) Date of Patent: Sep. 10, 2024

(54) METHOD AND APPARATUS FOR GENERATING INTERACTION RECORD, AND DEVICE AND MEDIUM

(71) Applicant: BEIJING BYTEDANCE NETWORK TECHNOLOGY CO., LTD., Beijing (CN)

(72) Inventors: Jingsheng Yang, Beijing (CN); Kojung Chen, Beijing (CN); Li Zhao, Beijing (CN); Xiao Han, Beijing (CN); Yin Shi, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/881,999

(22) Filed: Aug. 5, 2022

(65) Prior Publication Data

US 2022/0375460 A1 Nov. 24, 2022

Related U.S. Application Data

(63) Continuation of application No. PCT/CN2021/090395, filed on Apr. 28, 2021.

(30) Foreign Application Priority Data

Apr. 30, 2020 (CN) .......................... 202010366930.4

(51) Int. Cl.
*G10L 15/08* (2006.01)
*G10L 15/00* (2013.01)
(Continued)

(52) U.S. Cl.
CPC .......... *G10L 15/083* (2013.01); *G10L 15/005* (2013.01); *G10L 25/57* (2013.01); *G10L 25/72* (2013.01)

(58) Field of Classification Search
CPC ..... G10L 15/083; G10L 15/005; G10L 25/57; G10L 25/72; H04N 7/15; H04N 21/2187;
(Continued)

(56) References Cited

U.S. PATENT DOCUMENTS 6,119,147 A 9/2000 Toomey et al.
6,789,105 B2 * 9/2004 Ludwig ............... H04L 12/1818
709/204

(Continued)

FOREIGN PATENT DOCUMENTS

CN 102572356 A 7/2012
CN 104427294 A 3/2015
(Continued)

OTHER PUBLICATIONS

International Search Report issued Jul. 20, 2021 in International Patent Application No. PCT/CN2021/090935.
(Continued)

*Primary Examiner* — Fariba Sirjani

(57) ABSTRACT

A method and apparatus for generating an interaction record, and a device and a medium are provided. The method includes: firstly, from a multimedia data stream, collecting behavior data, represented by the multimedia data stream, of a user, wherein the behavior data includes voice information and/or operation information; and then, on the basis of the behavior data, generating interaction record data corresponding to the behavior data. According to the technical solution, by means of collecting voice information and/or operation information from a multimedia data stream, and generating interaction record data on the basis of the voice information and the operation information, an interacting user can determine interaction information by using the
(Continued)

interaction record data, and the interaction efficiency of the interacting user is improved, thereby also improving the user experience.

26 Claims, 5 Drawing Sheets

(51) Int. Cl.
  *G10L 25/57* (2013.01)
  *G10L 25/72* (2013.01)
(58) Field of Classification Search
  CPC ............. H04N 21/4312; H04N 21/433; H04N 21/44222; H04N 21/4508; H04N 21/4788
  See application file for complete search history.

(56) References Cited

U.S. PATENT DOCUMENTS

| | | | |
|---|---|---|---|
| 8,887,067 B2 | 11/2014 | Tripathi et al. | |
| 9,131,280 B2* | 9/2015 | Xiong | H04N 21/4532 |
| 11,758,087 B2* | 9/2023 | Cheng | H04N 5/775 |
| | | | 348/14.03 |
| 11,917,344 B2* | 2/2024 | Yang | G06F 16/483 |
| 11,949,528 B2* | 4/2024 | Dai | H04L 67/02 |
| 2004/0205478 A1* | 10/2004 | Lin | G06F 16/40 |
| | | | 715/202 |
| 2006/0136220 A1 | 6/2006 | Gurram et al. | |
| 2007/0083597 A1* | 4/2007 | Salesky | G06F 16/24 |
| | | | 709/204 |
| 2007/0188597 A1* | 8/2007 | Kenoyer | H04N 7/147 |
| | | | 348/14.08 |
| 2009/0300520 A1* | 12/2009 | Ashutosh | H04L 12/1831 |
| | | | 715/756 |
| 2011/0282648 A1* | 11/2011 | Sarikaya | G06F 40/44 |
| | | | 707/804 |
| 2012/0226987 A1* | 9/2012 | Wie | H04L 47/283 |
| | | | 715/736 |
| 2014/0099075 A1 | 4/2014 | Li et al. | |
| 2016/0094504 A1* | 3/2016 | Cinar | G06F 3/04847 |
| | | | 715/752 |
| 2016/0269254 A1* | 9/2016 | Forney | H04L 67/535 |
| 2017/0046659 A1 | 2/2017 | Inomata et al. | |
| 2017/0062013 A1 | 3/2017 | Carter et al. | |
| 2018/0095951 A1 | 4/2018 | Takamiya | |
| 2018/0109849 A1* | 4/2018 | Moran | G11B 27/34 |
| 2018/0293906 A1 | 10/2018 | Chen et al. | |
| 2018/0349092 A1 | 12/2018 | Chen | |
| 2019/0065458 A1* | 2/2019 | Brunet | G06Q 50/01 |
| 2019/0378497 A1 | 12/2019 | Lichun et al. | |
| 2022/0020373 A1* | 1/2022 | Zhang | G10L 15/22 |
| 2022/0239882 A1* | 7/2022 | Yang | G06F 3/167 |
| 2022/0375460 A1* | 11/2022 | Yang | G10L 25/57 |

FOREIGN PATENT DOCUMENTS

| | | |
|---|---|---|
| CN | 105632498 A | 6/2016 |
| CN | 105893636 A | 8/2016 |
| CN | 106657865 A | 5/2017 |
| CN | 107430723 A | 12/2017 |
| CN | 107659416 A | 2/2018 |
| CN | 109361825 A | 2/2019 |
| CN | 109388701 A | 2/2019 |
| CN | 109660447 A | 4/2019 |
| JP | 2000050226 A | 2/2000 |
| JP | 2002099530 A | 4/2002 |
| JP | 2004287201 A | 10/2004 |
| JP | 2007180828 A | 7/2007 |
| JP | 2011135390 A | 7/2011 |
| JP | 2015109565 A | 6/2015 |
| JP | 2017038304 A | 2/2017 |
| JP | 2017049968 A | 3/2017 |
| JP | 2018060362 A | 4/2018 |
| WO | 2017063287 A1 | 4/2017 |

OTHER PUBLICATIONS

First Office Action issued Oct. 27, 2021 in Chinese Patent Application No. 202010366930.4 (10 pages) with an English translation (10 pages).
Second Office Action issued May 31, 2022 in Chinese Patent Application No. 202010366930.4 (8 pages) with an English translation (9 pages).
Notice of Reasons for Refusal issued Nov. 21, 2023 in Japanese Application No. 2022-563348, with English translation (14 pages).
European Search Report and Search Opinion issued Aug. 2, 2023 in European Application No. 21795627.5 (10 pages).

\* cited by examiner

METHOD AND APPARATUS FOR GENERATING INTERACTION RECORD, AND DEVICE AND MEDIUM

The present disclosure is a continuation of International Application No. PCT/CN2021/090395, filed on Apr. 28, 2021 which claims the priority to Chinese Patent Application No. 202010366930.4, titled "METHOD AND APPARATUS FOR GENERATING INTERACTIVE RECORD, DEVICE AND MEDIUM", filed on Apr. 30, 2020, both of which are incorporated herein by reference in their entireties.

FIELD

Embodiments of the present disclosure relate to the technical field of computer data processing, and in particular, to a method and an apparatus for generating an interactive record, a device and a medium.

BACKGROUND

At present, a server may receive speech information of each speaking user in a real-time interaction or in a screen recording video, process the speech information, and play processed speech information.

However, in an practical application, speech content of the speaking user may not be determined based on the speech information. At this time, the speaking user is required to repeat a remark that has been made, or a specific meaning of the speaking user is guessed by following speech content of the speaking user, or a core idea of the speaking user is determined by playing back the screen recording video. In all the above manners, there will be technical problems of low interactive efficiency and poor user experience.

SUMMARY

According to embodiments of the present disclosure, a method and an apparatus for generating an interactive record, a device and a medium are provided, to optimize a way of recording an interactive process, thereby improving interactive communication efficiency.

In a first aspect, a method for generating an interactive record is provided according to an embodiment of the present disclosure. The method includes:

collecting, from a multimedia data stream, behavior data of a user represented by the multimedia data stream, where the behavior data includes speech information and/or operation information; and generating interactive record data corresponding to the behavior data, based on the behavior data.

In a second aspect, an apparatus for generating an interactive record is further provided according to an embodiment of the present disclosure. The apparatus includes a behavior data collection module and an interactive record data generation module.

The behavior data collection module is configured to collect, from a multimedia data stream, behavior data of a user represented by the multimedia data stream, where the behavior data includes speech information and/or operation information.

The interactive record data generation module is configured to generate interactive record data corresponding to the behavior data, based on the behavior data.

In a third aspect, an electronic device is further provided according to an embodiment of the present disclosure. The electronic device includes: one or more processors; and a storage apparatus configured to store one or more programs.

The one or more programs, when executed by the one or more processors, cause the one or more processors to implement the method for generating the interactive record according to any one of the embodiments of the present disclosure.

In a fourth aspect, a storage medium containing computer executable instructions is further provided according to an embodiment of the present disclosure. The computer executable instructions, when executed by a computer processor, cause the computer processor to execute the method for generating the interactive record according to any one of the embodiments of the present disclosure.

In the technical solution according to the embodiments of the present disclosure, speech information and/or operation information in a multimedia data stream are collected, and interactive record data is generated based on the speech information and the operation information. Therefore, an interactive user may determine interactive information by using the interactive record data. The interactive efficiency of the interactive user is improved, and the user experience is further improved.

BRIEF DESCRIPTION OF THE DRAWINGS

In conjunction with the drawings and with reference to the following embodiments, the above and other features, advantages and aspects of the embodiments of the present disclosure are more apparent. Throughout the drawings, the same or similar reference numbers refer to the same or similar elements. It should be understood that the drawings are schematic and that the components and elements are not necessarily drawn to scale.

DETAILED DESCRIPTION OF EMBODIMENTS

Figure 1:
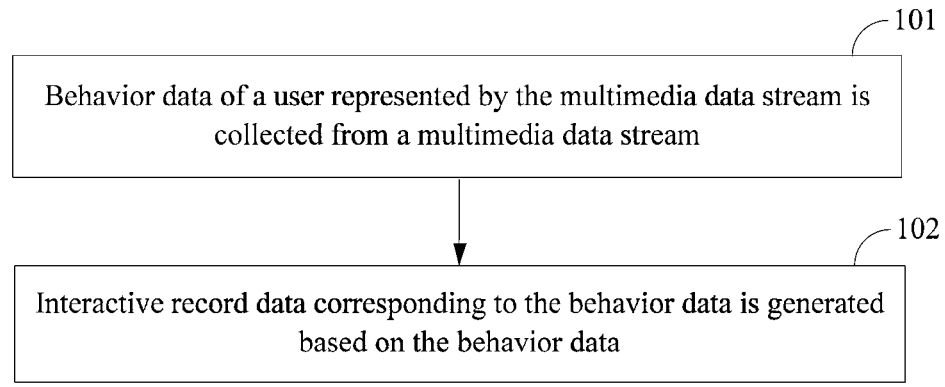
FIG. 1 is a schematic flowchart of a method for generating an interactive record according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different devices, modules or units, and are not used to limit an sequential order or interdependence of the functions performed by the devices, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

First Embodiment

Figure 7:
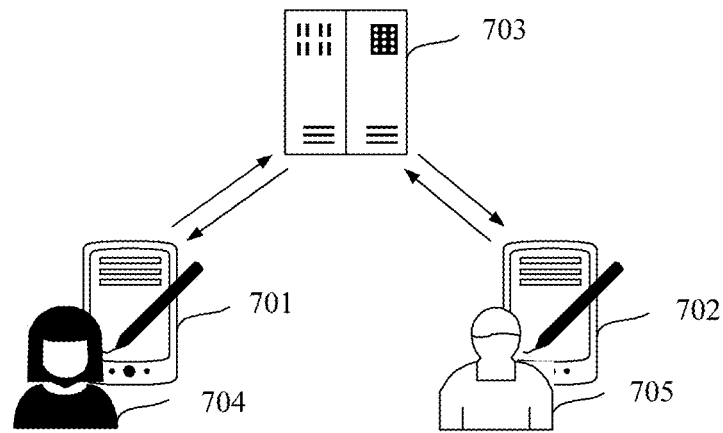
FIG. 7 is a schematic diagram of an application an application scenario according to an embodiment of the present disclosure.

FIG. 1 is a schematic flowchart of a method for generating an interactive record according to a first embodiment of the present disclosure. The embodiment of the present disclosure is applicable to a situation in which interactive record data is generated based on interactive information of a user in an interactive application scenario supported by the Internet. The method may be performed by an apparatus for generating an interactive record. The apparatus may be implemented in the form of software and/or hardware. FIG. 7 is a schematic diagram of an application an application scenario according to an embodiment of the present disclosure. In an embodiment, the apparatus may be implemented in an electronic device, such as the terminal device 701 or 702 as shown in FIG. 7. The electronic device may be a mobile terminal, a PC terminal, a server or the like. The interactive scenario is usually realized by a cooperation between a client and a server. The method according to the embodiment may be performed by the server, such as the server 703 as shown in FIG. 7; or by the cooperation between the client and the server.

As shown in FIG. 1, the method according to an embodiment includes the following steps S101 and S102.

In S101, behavior data of a user represented by the multimedia data stream is collected from a multimedia data stream.

The multimedia data stream may be video stream data corresponding to a real-time interactive interface, or video stream data of a screen recording video obtained by performing a screen recording on the real-time interactive interface. The real-time interactive interface is any interactive interface in a real-time interactive application scenario. The real-time interactive scenario may be realized by means of the Internet and computers, for example, by an interactive application program realized by a native program or a web program. In the real-time interactive interface, multiple users are allowed to interact in various forms of interactive behaviors, such as inputting text, speech, video, or sharing. The behavior data may include various data related to the interactive behavior, such as a type of interactive behavior, and specific content involved in the interactive behavior.

Therefore, speech data and/or behavior data of each interactive user participating in an interaction may be collected from a multimedia data stream corresponding to an interactive behavior interface, to generate interactive record data corresponding to the behavior data based on the behavior data.

In S102, interactive record data corresponding to the behavior data is generated based on the behavior data.

The interactive record data corresponds to the collected behavior data. The interactive record data may be a literal expression converted from speech information or the specific content in the interactive behavior. In an embodiment, the interactive record data may be an interactive record text corresponding to the behavior data. The interactive record text may include a literal expression corresponding to the speech information, or a literal expression converted from operation information. Alternatively, the interactive record text may include both the literal expression corresponding to the speech information and the literal expression corresponding to the operation information. The interactive record data may be generated by clients respectively, or by the server by uniform processing of behavior data of respective users.

Specifically, after acquiring the speech information and/or the operation information in the behavior data, the server may process the behavior data, to obtain a literal expression corresponding to the speech information and a literal expression corresponding to the operation information. That is, interactive record data corresponding to the behavior data is generated.

The advantages of generating the interactive record data are as follows. During a video conference or live broadcast, speech information of other speaking users cannot be understood or may be missed. In consideration of this case, behavior data of each speaking user may be collected, and interactive record data corresponding to the behavior data may be generated based on the behavior data. In this way, the user may view the speech information of other speaking users based on the interactive record data, to determine a core idea of each speaking user. The user interactive efficiency in an interactive process and the user experience are improved. It is also considered that when the speech information of the speaking user cannot be determined based on the screen recording video, the user is required to manually trigger a playback operation. For example, each time a playback control is triggered, a video may be rewound by five seconds, or a progress bar is dragged to control a playback screen of the screen recording video. Since it is impossible to accurately locate a video screen in which the speaking user makes a remark in this way, the user is required to manually operate multiple times, which increases the labor cost and reduces the user interactive efficiency. However, in the solution according to the embodiments of the present disclosure, the interactive record data corresponding to the screen recording video may be generated. Therefore, the core idea of each speaking user may be determined intuitively based on the interactive record data, which improves the convenience and efficiency of the interaction.

For example, it is assumed that speech information of two users and operation information triggered in the video conference are acquired based on the multimedia data stream. For example, the operation information may be a trigger for a certain paragraph of text in the document. Then, the speech information and the operation information may be converted into a literal expression. Moreover, content of the certain paragraph of text triggered by the speaking user may also be obtained, such that the literal expression and text content may be used as interactive record data.

In order to facilitate the speaking user to determine speech information and operation information of other speaking users based on the interactive record data, data recorded in the interactive record data may include an identification of the speaking user, speaking time and a corresponding literal expression. For example, the data recorded in the interactive record data may be "ID1-20:00-I agree with this thing".

In the technical solution according to the embodiments of the present disclosure, speech information and/or operation information in a multimedia data stream are collected, and interactive record data is generated based on the speech information and the operation information. Therefore, an interactive user may determine interactive information by using the interactive record data, so as to improve the interactive efficiency of the interactive user and the user experience.

In an embodiment of the present disclosure, the behavior data includes the operation information. In this case, in S102, the interactive record data corresponding to the behavior data is generated by determining an operation object and an operation behavior in the operation information, and generating the interactive record data based on an association relationship between the operation object and the operation behavior.

The user may have various operation behaviors. Accordingly, there may be various operation objects corresponding to the operation behaviors. The operation object and the operation behavior in the operation information may be acquired, and the operation object and operation behavior may be converted into corresponding interactive record data.

In an embodiment, there are various operation behaviors of the user. Typical operation behavior data of the user may include a to-be-shared behavior and a to-be-shared object. The to-be-shared behavior may include a document sharing operation and/or a screen sharing operation. The to-be-shared object may be specific content to be shared. In an embodiment, if the operation information includes document sharing operation information, the operation object includes a shared document, and the operation behavior includes a behavior to share the document. On this basis, the generating interactive record data corresponding to the behavior data based on the behavior data includes: determining a document sharing address and/or storage address associated with the shared document based on the shared document, and generating the interactive record data based on the shared address and/or storage address. If the operation information includes screen sharing operation information, the operation object includes a shared screen, and the operation behavior includes a behavior to share the shared screen. On this basis, the generating interactive record data corresponding to the behavior data based on the behavior data includes: determining identification information in the shared screen based on the shared screen, and generating the interactive record data based on the identification information. Those skilled in the art may understand that in a multimedia-based interactive application scenario, the operation behavior of the user may be, but not limited to, those listed above. For example, it may also include writing on a whiteboard and other behaviors.

Second Embodiment

Figure 2:
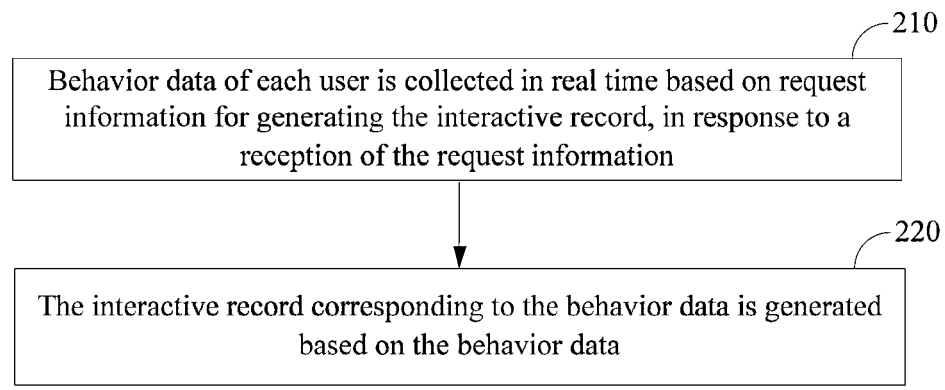
FIG. 2 is a schematic flowchart of a method for generating an interactive record according to a second embodiment of the present disclosure.

FIG. 2 is a schematic flowchart of a method for generating an interactive record according to a second embodiment of the present disclosure. This embodiment is based on the foregoing embodiment, and the multimedia data stream may be determined based on a real-time interactive interface, or may be determined based on a screen recording video. When the methods for acquiring a multimedia data stream are different, collected behavior data of a user represented by the multimedia data stream is different, and accordingly there are certain differences in the generation of interactive record data corresponding to the behavior data. In the embodiment, the description is given with an example that the multimedia data stream is determined based on the real-time interactive interface.

As shown in FIG. 2, the method according to the embodiment includes the following steps S210 and S220.

In S210, behavior data of each user is collected based on request information for generating the interactive record, in response to a reception of the request information.

When the interactive record data is generated based on the real-time interactive interface, it can be detected whether each speaking user has triggered a target control. In an embodiment, the target control may be a control for generating interactive record data. If the target control is triggered, behavior data of each speaking user may be collected. Otherwise, no behavior data of the speaking user is collected. The server generates an interactive record by the following steps. In a process of real-time interaction, such as in a process of video conference, if the user triggers an interactive record generation control on a client, the client may generate request information of the interactive record in response to the trigger operation and send the request information to the server. After receiving the request information, the server may start collecting speech information and/or operation information of each interactive user in real time based on the request information.

In an embodiment, the behavior data of the user represented by the multimedia data stream is collected by: receiving speech information of each user collected by a client; and/or receiving request information corresponding to a trigger operation and determining operation information corresponding to the request information.

In an embodiment, a user who participates in real-time interaction may be referred to as an interactive user or a speaking user. If an interactive user A expresses some remarks through speech, a client corresponding to the interactive user A may collect speech data of the interactive user A; and/or if a server receives request information corresponding to a trigger operation, the operation triggered by the interactive user on the client may be determined based on the request information, and then an operation object and an operation behavior corresponding to the trigger operation are determined to generate an interactive record based on the operation object and the operation behavior.

In S220, the interactive record corresponding to the behavior data is generated based on the behavior data.

In an embodiment, in the case that the behavior data includes the operation information, the determining an operation object and an operation behavior in the operation information, and generating the interactive record data based on an association relationship between the operation object and the operation behavior includes: in a case of detecting a trigger operation for sharing a document, acquiring a shared document and associated information corresponding to the shared document; determining the operation information based on the trigger operation, the shared document and the associated information, where the associated information includes a shared link of the shared document and/or a storage address of the shared document; and generating the interactive record data corresponding to the behavior data based on the operation information.

If the trigger operation is a document sharing operation, the operation object in the operation information is a shared document, and the operation behavior is an operation to share the document. In this case, the interactive record is generated based on the operation information by: in a case of detecting a triggering of a sharing control, acquiring the shared document in the multimedia video stream; and determining a shared link corresponding to the shared document or a storage address of the shared document. A piece of data in the interactive record data may be generated based on the trigger operation for sharing the document, the shared document, and the link or storage address corresponding to the shared document. For example, the interactive record data corresponding to the sharing trigger operation may be: ID-sharing operation-shared document A-storage link is http//xxxxxxxxxx.com.

In an embodiment, the behavior data includes the operation information, and the operation information includes screen sharing operation information. In this case, the interactive record data corresponding to the operation information is generated by: in a case of detecting a trigger operation for sharing a screen, identifying identification information in a shared screen; determining the operation information based on the identification information, the trigger operation for sharing the screen and the shared screen; and generating the interactive record data based on the operation information. The identification information includes a link in the shared screen.

If the trigger operation is a screen sharing operation, the operation object in the operation information is a shared screen, and the operation behavior is an operation to share the screen. In this case, an interactive record may be generated based on the operation information by: in a case of detecting a triggering of a sharing control, acquiring the shared screen in the multimedia video stream, and extracting the identification information in the shared screen. If content displayed in the shared screen is web page information, the extracted identification information in the shared screen may be a link to the web page. Therefore, a piece of data in the interactive record data may be generated based on the trigger operation for sharing the screen, the shared screen and the identification information in the shared screen.

In an embodiment, by generating the interactive record corresponding to the operation information, the operation behavior of the interactive user may be determined, and information associated with the operation object in the operation information may be recorded, so that the user calls the content in the shared document or the shared screen based on the operation information recorded in the interactive record data. The interactive efficiency of the real-time interaction is further improved.

Of course, in a process of real-time interaction, such as, in a process of video conference, the collected behavior data inevitably includes speech information of each interactive user. In an embodiment, if the behavior data includes the speech information, the interactive record data corresponding to the behavior data may be generated based on the behavior data by: performing speech recognition on the speech information, and generating the interactive record data based on a recognition result of the speech information.

The speech recognition on the speech information may include: voiceprint recognition. Identity information of each speaking user may be determined based on a result of the voiceprint recognition. The speech recognition on the speech information may also include language type recognition. A target language type of the speaking user to which the speech information belongs may be determined, and speech information of each speaking user may be translated into a literal expression of the same type as the target language type. The advantage of this treatment is that speech data of other language types may be translated into interactive record data of the same type as the target language type, so that the user is assisted to understand the speech information of other users according to the interactive record data, and the communication efficiency in the interactive process is improved.

In an embodiment, the performing speech recognition on the speech information, and generating the interactive record data based on a speech recognition result of the speech information includes: determining a target language type of a speaking user to which the speech information belongs; and processing the speech information in the behavior data based on the target language type, to generate the interactive record data.

It should be noted that a user corresponding to each client may be referred to as a speaking user, and the client may be referred to as a target client. The target language type may be a language type currently used by a target speaking user, or a language type preset on the client by the target speaking user.

In an embodiment, the target language type of the speaking user to which speech information belongs may be determined based on the speech information, and the speech data may be converted into interactive record data of the same type as the target language type.

The target language type may be a language type which is used by the speaking user or preset on the client by the speaking user. That is, the target language type may be a language familiar to the speaking user. Therefore, when speech data of other speaking users is converted into interactive record data corresponding to the target language type, the efficiency of reading the interactive record data by the speaking user may be improved, and the speaking user is assisted to understand speech information of other speaking users conveniently and accurately. Thereby, the technical effect of improving interactive efficiency is achieved.

In an embodiment, the determining a target language type of a speaking user to which the speech information belongs includes: determining the target language type based on a language type of a speaking user to which a current client belongs.

That is, the target language type may be determined based on the language type of the speaking user to which each client belongs.

In an embodiment, determining the language type of the speaking user to which the current client belongs includes at least one of: determining the language type of the user by performing language type recognition on the speech information in the behavior data; acquiring a language type preset on the client; and acquiring a login address of the client and determining the language type corresponding to the user based on the login address.

In the first way, speech information in the behavior data is acquired; a language type of the speaking user corresponding to the speech information is determined based on the speech information; and the language type is used as the target language type. For example, the speech information of the speaking user A is collected and processed, and then it is determined that the language type of the speaking user A is Chinese. Thus, Chinese language type may be used as the target language type.

For example, it is assumed that three users participate in the real-time interaction. In an embodiment, the real-time interaction is a video conference. The three users may be marked as a user A, a user B, and a user C, respectively. The language type used by the user A is Chinese language type, the language type used by the user B is English language type, and the language type used by the user C is Japanese language type. When the user A triggers a subtitle display control, speech information of the user A, the user B and the user C may be collected separately. The speech information of the user A is processed to determine that the language type of the user A is Chinese. At this time, Chinese may be used as the target language type. At this time, the speech information of user B and user C may be translated into Chinese, and the operation information may be converted into Chinese. That is, the interactive record data is data in Chinese which is obtained by converting behavior data of each user into Chinese. Of course, when the user B triggers the subtitle display control, the target language type may be determined to be English based on the speech information of the user B. The speech information of user A and user C may be translated into English. That is, the language type of the speaking user may be used as the target language type, and the speech information of other speaking users may be translated into the target language type as interactive record data.

In the second way, when the speaking user triggers an operation of displaying a subtitle, a language type of the subtitle is set, and the set language type is used as the target language type. For example, when the speaking user triggers a subtitle display control, a language selection list may pop up for the user to choose. The user may choose any language type. For example, if the user triggers Chinese language type in the language selection list and clicks a confirmation button, the server or client may determine that the speaking user has selected the Chinese language type, and the Chinese language type is used as the target language type.

In the third way, when it is detected that the speaking user triggers a subtitle display control, a login address of the client, that is, an IP address of the client is acquired, to determine a region to which the client belongs based on the login address. Then, the language type used in the region is used as the target language type. For example, when the user triggers the subtitle display control, the login address of the client may be acquired. It is determined that the region to which the client belongs is China, based on the login address. Thus, the target language type is Chinese.

In an embodiment, the target language type corresponding to each speaking user is determined, and the speech information of other speaking users is translated into the target language type, so that the generated interactive record data conforms to reading habits of each speaking user. Therefore, the user can quickly understand the speech information of other speaking users, thereby improving the interactive efficiency.

It should be noted that in the process of collecting the behavior data of each speaking user and generating the interactive record, when a control for suspending the collection is triggered by the user, the behavior data of the user may no longer be collected, and the interactive record data corresponding to the behavior data may no longer be generated.

In the technical solution according to the embodiments of the present disclosure, the behavior data of each speaking user is collected in the process of real-time interaction, and the behavior data is converted into interactive record data in the target language type, thereby being convenient for the speaking user to understand the speech information of other speaking users based on the interactive record data and to perform an interactive review based on the interactive record data. In this way, the interactive efficiency is improved and the summary of conference content is conveniently performed.

On the basis of the above technical solution, when it is detected that a new interactive user is added in the interactive interface, that is, when a new speaking user is added, historical interactive record data in the current interactive interface is acquired, and an historical interactive record is sent to a client of the new user.

That is, in a process of real-time interaction, such as in a process of video conference, if a new speaking user is added, historical interactive record data may be acquired in a process of a determination of a target language type of the new speaking user. The historical interactive record data is then converted into interactive record data of the same type as the target language type, and sent to a client corresponding to the new user for reading. The advantage of this setting method is that when a new user joins the interaction, the new user may learn the historical speech information of each speaking user in time to determine the opinions or remarks held by each speaking user, thereby facilitating the effective communication with other speaking users.

Third Embodiment

Figure 3:
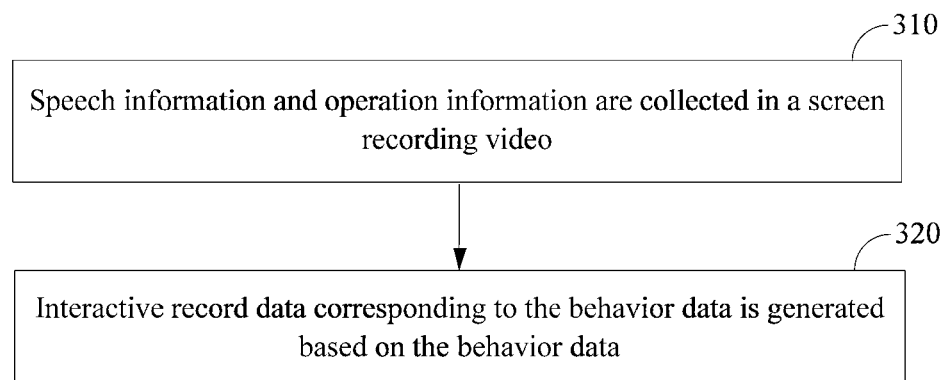
FIG. 3 is a schematic flowchart of a method for generating an interactive record according to a third embodiment of the present disclosure.

FIG. 3 is a schematic flowchart of a method for generating an interactive record according to a third embodiment of the present disclosure. On the basis of the first embodiment, the multimedia data stream may also be determined based on a screen recording video. The collection of behavior data and the generation of interactive record data may be optimized.

As shown in FIG. 3, the method includes the following steps S310 and S320.

In S310, speech information and operation information are collected in a screen recording video.

In a real-time interactive process, a screen recording device may be used to record the interactive process to obtain a screen recording video. For example, in a video conference, the video conference is recorded, and the recorded video conference is used as the screen recording video. Based on the screen recording video, speech information and operation information of each speaking user may be determined.

In an embodiment, when interactive record data is required to be generated based on the screen recording video, the user may first trigger an interactive record data generation control. Based on the trigger operation of the user, speech information and operation information may be collected from the multimedia data stream of the screen recording video.

In step S320, interactive record data corresponding to the behavior data is generated based on the behavior data.

In an embodiment, if the collected screen recording video includes speech data, the speech data may be processed by: performing voiceprint recognition on the speech information to determine a speaking user corresponding to the speech information; performing speech recognition on the speech information to obtain a speech recognition result; and generating the interactive record data corresponding to the behavior data based on an association between the speaking user and the speech recognition result.

Generally, each client has a corresponding client account or client ID. Thus, different speaking users may be distinguished based on different client accounts. However, based on the screen recording video, the speaking user may not be distinguished by the client ID. In this case, the voiceprint recognition may be performed on the speech information of each speaking user. Since each speaking user has a unique voiceprint in terms of speech, different speaking users may be distinguished accordingly. The interactive record data may include user A-translation corresponding to speech data, and user B-translation corresponding to speech data.

In an embodiment, speech information in the screen recording video is collected. The voiceprint recognition is performed on the speech to determine identities of different speaking users. Translation data corresponding to speech data is determined by analyzing and processing the speech data. The identity of the speaking user is associated with the translation data, and the interactive record data corresponding to the behavior data is determined. The interactive record data may include speaking user A-translated behavior data; speaking user B-translated behavior data or the like.

The screen recording video further includes operation information of the speaking user. The operation information may be processed, by performing information extraction on an operation object in the operation information to generate the interactive record data corresponding to the behavior data.

Figure 8A:
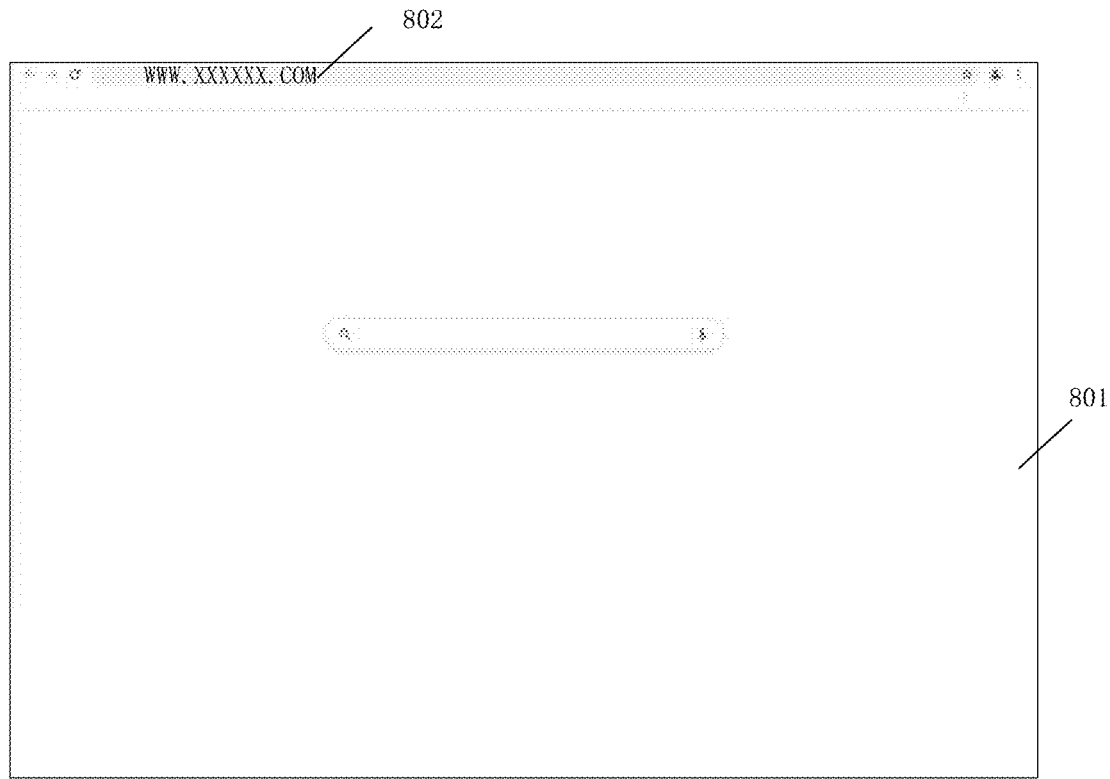
FIG. 8A is a schematic diagram of an interface for collecting behavior data according to an embodiment of the present disclosure.
Figure 8B:
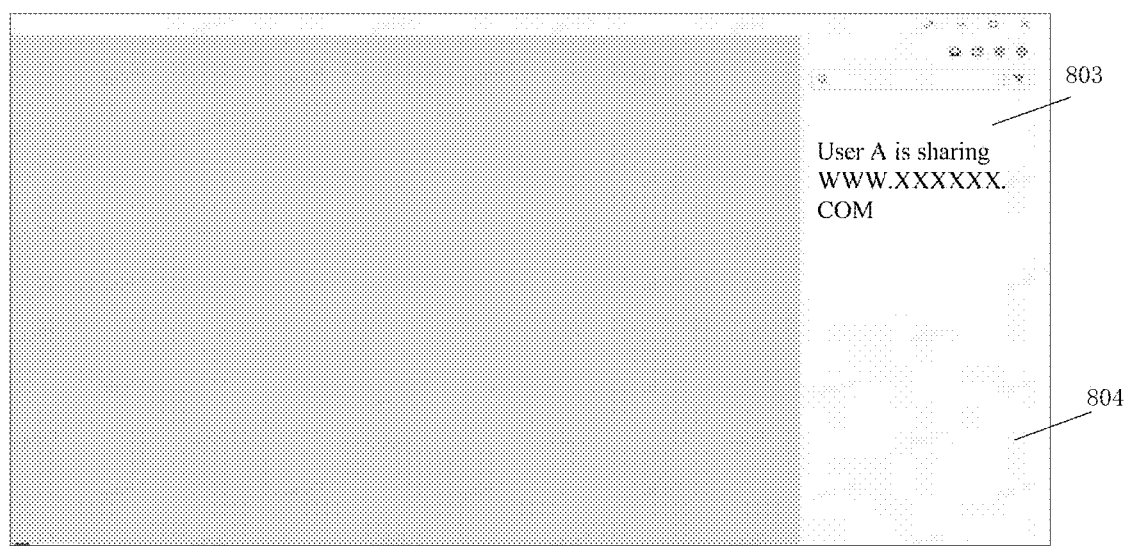
FIG. 8B is a schematic diagram of an interface for displaying interactive record data according to an embodiment of the present disclosure.

In an embodiment, the performing information extraction on an operation object in the operation information to generate the interactive record data corresponding to the behavior data may include: determining a target element corresponding to the operation information in a target image based on image recognition; and generating the interactive record corresponding to the behavior data based on the target element. FIG. 8A is a schematic diagram of an interface for collecting behavior data according to an embodiment of the present disclosure. FIG. 8B is a schematic diagram of an interface for displaying interactive record data according to an embodiment of the present disclosure. As shown in FIG. 8A, the target image 801 includes an image corresponding to a shared document and/or an image corresponding to a shared screen. The target element 802 may be at least one or more of identification information such as a target link, a target storage address, a name of a movie, and a name of a TV series. Therefore, as shown in FIG. 8B, the interactive record data 803 may be generated based on the above-mentioned information. That is, the interactive record data 803 includes information such as the target link, the target storage address, the name of the movie, the name of the TV series, and the like.

In the technical solution according to the embodiments of the present disclosure, the behavior data of each speaking user in the screen recording video is collected, and interactive record data corresponding to the behavior data is generated, thereby being convenient for the user to determine a core idea of each speaking user by browsing the interactive record data. The playback of the screen recording video when the core idea of the speaking user is determined in the related technology is avoided. For example, in the case of a long pause in the screen recording video, the user is required to wait for a certain period of time or trigger a fast-forward button. The triggering for the fast-forward button is difficult to accurately locate a position the user wants to browse, resulting in a waste of time and low efficiency of real-time interactive review. The screen recording video is converted into the corresponding interactive record text, which may be browsed quickly, such that the core idea of each speaking user may be understood in a timely and convenient manner, which implements the technical effect of saving time.

Fourth Embodiment

Figure 4:
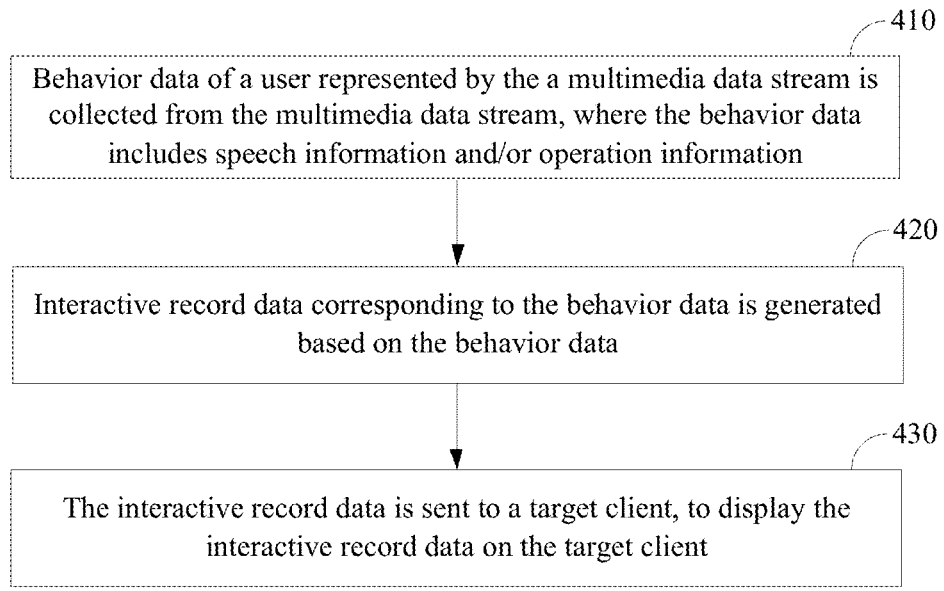
FIG. 4 is a schematic flowchart of a method for generating an interactive record according to a fourth embodiment of the present disclosure.

Based on the above embodiments, after the interactive record data is generated, the interactive record data may be displayed on a display interface. FIG. 4 is a schematic flowchart of a method for generating an interactive record according to a fourth embodiment of the present disclosure. As shown in FIG. 4, the method includes the following steps S410 to S430.

In step S410, behavior data of a user represented by a multimedia data stream is collected from the multimedia data stream, where the behavior data includes speech information and/or operation information.

In step S420, interactive record data corresponding to the behavior data is generated based on the behavior data.

In step S430, the interactive record data is sent to a target client, to display the interactive record data on the target client.

A client corresponding to a speaking user is used as a target client.

Specifically, after the interactive record data is determined, the interactive record data may be sent to the target client to display the interactive record data on the target client.

As shown in FIG. 8B, when displayed on the client, the interactive record data 803 may be displayed in a target area 804. In an embodiment, the interactive record data 803 is displayed in the target area 804.

A display area of an interactive record may be preset and the preset display area may be used as the target area. The target area may be, for example, an area beside a main interactive area, which may be at the top, the bottom, or a side of the main interactive area. For example, in a video conference scenario, a video interactive window is the main interactive area, which occupies ⅔ of the screen area. An area for displaying interactive record data may be a ⅓ area of the screen area at the side of the video interactive window. That is, the ⅓ area at the side of the video interactive window is the target area, in which the interactive record data may be displayed. In an embodiment, the displaying the interactive record data in a target area includes: displaying the interactive record data in the target area in a form of a bullet screen. The target area includes a blank area in a video interface.

In an embodiment, the blank area may be an area that does not include any elements in the interactive interface, for example, elements such as a text and a profile picture. The blank area may be preset to store interactive record data in the target area. Of course, the blank area may be updated in real time. In an embodiment, the blank area may be updated in real time, based on image information displayed on a display interface.

That is, the server may detect the interactive interface in real time, for example, detect a video conference interface; and determine an area without any elements on the display interface in real time based on each element displayed on the interactive interface; and use the area determined at this time as a blank area.

On the basis of the above technical solution, after the interactive record data is generated, the interactive record data may also be stored in a target location.

In an embodiment, the interactive record data may be stored locally. Alternatively, the interactive record data may be stored in a cloud, and a storage link corresponding to the interactive record data may be generated to acquire the interactive record data based on the storage link.

In an actual application process, in order to review the conference, for example, after the video conference, it is required to review the content in the video conference or summarize the conference content, the interactive record data may be exported to the target location.

In an embodiment, in a case that the target location may be in the cloud or local, the storing the interactive record data in a target location may include: exporting the interactive record data locally; and/or storing the interactive record data in the cloud, and generating a storage link corresponding to the interactive record data to acquire the interactive record data based on the storage link.

In the technical solution according to the embodiments of the present disclosure, the interactive record data may be displayed in the target area, so that the user may browse the interactive record data displayed on the interactive interface in the real-time interaction process, which is convenient for the user to read the interactive record data.

Fifth Embodiment

Figure 5:
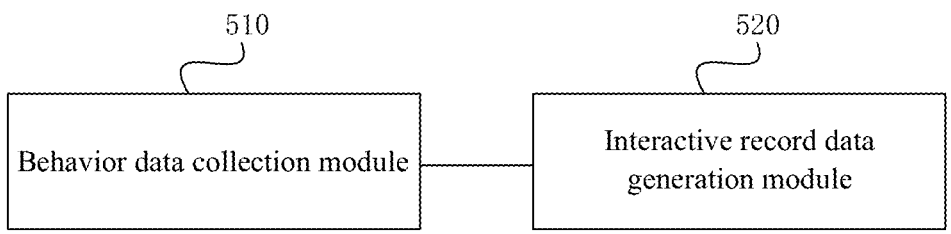
FIG. 5 is a schematic structural diagram of an apparatus for generating an interactive record according to a fifth embodiment of the present disclosure.

FIG. 5 is a schematic structural diagram of an apparatus for generating an interactive record according to a fifth embodiment of the present disclosure. As shown in FIG. 5, the apparatus includes a behavior data collection module 510 and an interactive record data generation module 520.

The behavior data collection module 510 is configured to collect behavior data of a user represented by the multimedia data stream, from a multimedia data stream, where the behavior data includes speech information and/or operation information. The interactive record data generation module 520 is configured to generate interactive record data corresponding to the behavior data based on the behavior data.

In the technical solution according to the embodiments of the present disclosure, speech information and/or operation information in a multimedia data stream are collected, and interactive record data is generated based on the speech information and the operation information. Therefore, an interactive user may determine interactive information by the interactive record data. The interactive efficiency of the interactive user and the user experience are improved.

On the basis of the above technical solution, in the case that the behavior data includes the operation information, the interactive record data generation module is further configured to determine an operation object and an operation behavior in the operation information, and generate the interactive record data based on an association relationship between the operation object and the operation behavior.

On the basis of the above technical solution, in the case that the operation information includes document sharing operation information, the operation object includes a shared document and the operation behavior includes a behavior to share a document, and the interactive record data generation module is further configured to determine a document sharing address and/or a storage address associated with the shared document based on the shared document, and generate the interactive record data based on the shared address and/or the storage address.

On the basis of the above technical solution, in the case that the operation information includes screen sharing operation information, the operation object includes a shared screen and the operation behavior includes a behavior to share the shared screen, and the interactive record data generation module is further configured to determine identification information in the shared screen based on the shared screen, and generate the interactive record data based on the identification information.

On the basis of the above technical solution, the behavior data collection module is further configured to collect speech information and operation information in a screen recording video.

On the basis of the above technical solution, the behavior data collection module further includes a speaking user determination unit, a speech recognition unit, and an interactive record data generation unit.

The speaking user determination unit is configured to perform voiceprint recognition on the speech information to determine a speaking user corresponding to the speech information. The speech recognition unit is configured to perform speech recognition on the speech information to obtain a speech recognition result. The interactive record data generation unit is configured to generate the interactive record data corresponding to the behavior data, based on an association between the speaking user and the speech recognition result.

On the basis of the above technical solution, the behavior data collection module is further configured to generate the interactive record data corresponding to the behavior data by performing information extraction on the operation object in the operation information.

On the basis of the above technical solution, the behavior data collection module is further configured to determine a target element in a target image corresponding to the operation information based on image recognition; and generate an interactive record corresponding to the behavior data based on the target element; where the target image includes an image corresponding to a shared document and/or an image corresponding to a shared screen. On the basis of the above technical solution, in the case that the multimedia data stream is a data stream generated based on a real-time interactive interface, the behavior data collection module is further configured to collect behavior data of each user in real time based on request information for generating the interactive record, in response to a reception of the request information.

On the basis of the above technical solution, the behavior data collection module is further configured to receive speech information of each user collected by a client; and/or receive request information corresponding to a trigger operation, and determine operation information corresponding to the request information.

On the basis of the above technical solution, in the case that the behavior data includes the operation information, the interactive record data generation module is further configured to: acquire a shared document and associated information corresponding to the shared document, in response to a detection of a trigger operation for sharing a document; determine the operation information based on the trigger operation, the shared document and the associated information, where the associated information includes a shared link of the shared document and/or a storage address of the shared document; and generate the interactive record data corresponding to the behavior data based on the operation information.

On the basis of the above technical solution, in the case that the behavior data includes the operation information, the interactive record data generation module is further configured to: identify identification information in a shared screen, in response to a detection of a trigger operation for sharing a screen; determine the operation information based on the identification information, the trigger operation and a video frame of the shared screen; and generate the interactive record data corresponding to the behavior data based on the operation information, where the identification information includes a link in the shared screen.

On the basis of the above technical solution, in the case that the behavior data includes the speech information, the interactive record data generation module is further configured to perform speech recognition on the speech information, and generate the interactive record data based on an obtained speech recognition result.

On the basis of the above technical solution, the interactive record data generation module further includes a language type determination unit and an interactive record data generation sub-module.

The language type determination unit is configured to determine a target language type of a speaking user to which the speech information belongs. The interactive record data generation sub-module is configured to process the speech information in the behavior data based on the target language type, to generate the interactive record data.

On the basis of the above technical solution, the language type determination unit is further configured to determine the target language type based on a language type of a speaking user to which a current client belongs.

On the basis of the above technical solution, the language type of the speaking user to which the current client belongs is determined by at least one of: determining the language type of the user by performing language type recognition on the speech information in the behavior data; acquiring a language type preset on the client; and acquiring a login address of the client, and determining the language type corresponding to the user based on the login address.

On the basis of the above technical solution, the apparatus further includes an interactive record data display module configured to send the interactive record data to a target client, to display the interactive record data on the target client.

On the basis of the above technical solution, the apparatus further includes the interactive record data display module further configured to display the interactive record data in a target area.

On the basis of the above technical solution, the target area is located at a periphery of a multimedia interface, or is located at a blank area in a video interface.

On the basis of the above technical solution, the interactive record data display module is further configured to display the interactive record data in the target area in a form of a bullet screen, where the target area includes a blank area in the video interface.

On the basis of the above technical solution, the blank area is updated in real time based on image information displayed on a display interface.

On the basis of the above technical solution, the apparatus further includes an interactive record data storage module configured to store the interactive record data in a target location.

On the basis of the above technical solution, the interactive record data storage module is further configured to store the interactive record data locally; and/or store the interactive record data in a cloud, and generate a storage link corresponding to the interactive record data, to acquire the interactive record data based on the storage link.

On the basis of the above technical solution, the multimedia data stream includes a video data stream based on a multimedia conference, a video data stream based on a live video broadcast, or a video data stream during a group chat.

The apparatus according to the embodiments of the present disclosure may perform the method according to any embodiment of the present disclosure, and has corresponding functional modules and beneficial effects for performing the method.

It should be noted that each unit and module included in the above apparatus is divided according to its functional logic, but the above division is not limited as long as the corresponding functions can be realized. In addition, a name of each function unit is only intended to distinguish each other in convenience, and is not intended to limit the protection scope of the embodiments of the present disclosure.

Sixth Embodiment

Figure 6:
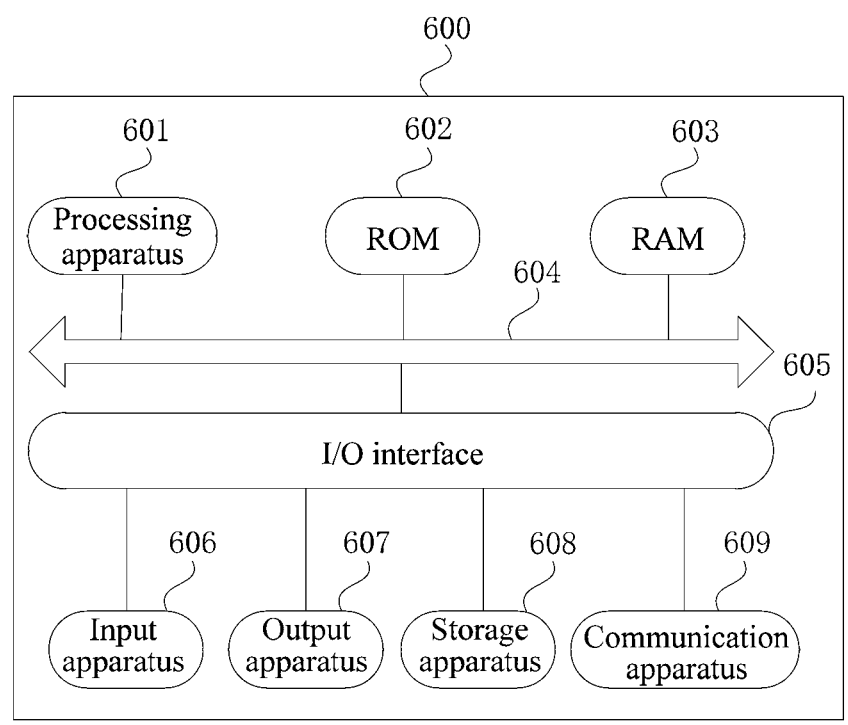
FIG. 6 is a schematic structural diagram of an electronic device according to a sixth embodiment of the present disclosure.

Reference is made to FIG. 6, which is a schematic structural diagram of an electronic device (e.g., a terminal device or a server in FIG. 6) 600 suitable for implementing the embodiments of the present disclosure. The terminal device according to the embodiments of the present disclosure may include, but be not limited to, mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs and desktop computers. The electronic device shown in FIG. 6 is only exemplary, and should not indicate any limitation to the function and scope of application of the embodiments of the present disclosure.

As shown in FIG. 6, the electronic device 600 may include a processing apparatus (e.g., a central processing unit or a graphics processor) 601, which may execute various operations and processing based on a program stored in a read only memory (ROM) 602 or a program loaded from a storage apparatus 608 into a random access memory (RAM) 603. The RAM 603 is further configured to store various programs and data required by the electronic device 600 to perform an operation. The processing apparatus 601, the ROM 602 and the RAM 603 are connected to each other through a bus 604. An input/output (I/O) interface 605 is also connected to the bus 604.

Generally, the I/O interface 605 may be connected to: an input apparatus 606, such as a touch screen, a touch panel, a keyboard, a mouse, a camera, a microphone, an accelerometer, and a gyroscope; an output apparatus 607, such as a liquid crystal display (LCD), a speaker, and a vibrator; a storage apparatus 608 such as a magnetic tape and a hard disk; and a communication apparatus 609. The electronic device 600 may perform a wireless or wired communication on other devices for data exchanging via the communication apparatus 609. Although FIG. 6 shows an electronic device 600 having various components, it should be understood that the illustrated components are not necessarily required to all be implemented or included. Alternatively, more or fewer components may be implemented or included.

Particularly, according to the embodiments of the present disclosure, the processes described above with reference to the flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 609, or installed from the storage apparatus 608, or installed from the ROM 602. When the computer program is executed by the processing apparatus 601, the functions defined in the method according to the embodiment of the present disclosure are performed.

The electronic device according to the embodiment of the present disclosure and the method for generating the interactive record according to the above embodiments belong to the same inventive concept. For technical details not described in detail in this embodiment, reference may be made to the above embodiments, and this embodiment has the same beneficial effects as the above embodiments.

Seventh Embodiment

A computer storage medium storing a computer program is provided according to an embodiment of the present disclosure. The program is executed by a processor to implement the method for generating the interactive record according to the above embodiments.

It is to be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any proper combination thereof.

In some embodiments, the client and the server may communicate using any currently known or future developed network protocol such as HyperText Transfer Protocol (HTTP), and may be interconnected with any form or medium of digital data communication (e.g., a communication network). Examples of the communication network include a local area network ("LAN"), a wide area network ("WAN"), the internet (e.g., the Internet), and an end-to-end network (e.g., ad hoc end-to-end network) or any of a currently known or a future developed network.

The computer readable medium may be incorporated in the electronic device, or may exist alone without being assembled into the electronic device.

The computer readable medium carries one or more programs. The one or more programs, when executed by the electronic device, cause the electronic device to: collect, from a multimedia data stream, behavior data of a user represented by the multimedia data stream, where the behavior data includes speech information and/or operation information; and generate interactive record data corresponding to the behavior data, based on the behavior data.

The computer program code for performing the operations disclosed in the embodiments of the present disclosure may be written in one or more programming languages or combinations thereof. The programming languages include but are not limited to an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flowcharts and block diagrams in the drawings illustrate the architecture, functions and operations that may be implemented by the system, method and computer program product according to the embodiments of the present disclosure. In this regard, each block in the flowcharts or the block diagrams may represent a module, a program segment, or a part of code. The module, the program segment, or the part of code contains one or more executable instructions for implementing the specified logical function. It should be also noted that, in some alternative implementations, the functions shown in the blocks may be performed in an order different from the order shown in the drawings. For example, two blocks shown in succession may actually be executed in parallel, or sometimes may be executed in a reverse order, which depends on the functions involved. It should also be noted that, each block in the block diagrams and/or the flowcharts and a combination of blocks in the block diagrams and/or the flowcharts may be implemented by a dedicated hardware-based system performing specified functions or operations, or may be implemented by a combination of dedicated hardware and computer instructions.

The units mentioned in the description of the embodiments of the present disclosure may be implemented by means of software, or otherwise by means of hardware. The name of the unit/module does not constitute a limitation on the unit itself under certain circumstances. For example, a behavior data collection module may also be described as a "collection module".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, a system, an apparatus or a device in an electronic, magnetic, optical, electromagnetic, infrared, or semi-conductive form, or any suitable combination thereof. The machine readable storage medium, for example, includes an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

According to one or more embodiments of the present disclosure, a method for generating an interactive record is provided in a first example. The method includes:
 collecting, from a multimedia data stream, behavior data of a user represented by the multimedia data stream, where the behavior data includes speech information and/or operation information; and
 generating interactive record data corresponding to the behavior data based on the behavior data.

According to one or more embodiments of the present disclosure, the method for generating the interactive record is provided in a second example. In the method, in a case that the behavior data includes the operation information, the generating interactive record data corresponding to the behavior data includes: determining an operation object and an operation behavior in the operation information, and generating the interactive record data based on an association relationship between the operation object and the operation behavior.

According to one or more embodiments of the present disclosure, the method for generating the interactive record is provided in a third example. In the method, in a case that the operation information includes document sharing operation information, the operation object includes a shared document, and the operation behavior includes a behavior to share a document, and the generating interactive record data corresponding to the behavior data based on the behavior data includes:
 determining a document sharing address and/or a storage address associated with the shared document, based on the shared document; and generating the interactive record data, based on the shared address and/or the storage address.

According to one or more embodiments of the present disclosure, the method for generating the interactive record is provided in a fourth example. In the method, in a case that the operation information includes screen sharing operation information, the operation object includes a shared screen, the operation behavior includes a behavior to share the shared screen, and the generating interactive record data corresponding to the behavior data based on the behavior data includes:
 determining identification information in the shared screen based on the shared screen, and generating the interactive record data based on the identification information.

According to one or more embodiments of the present disclosure, the method for generating the interactive record is provided in a fifth example. In the method, in a case that an interactive interface is a screen recording video of a real-time interactive interface, the collecting behavior data of a user represented by the multimedia data stream includes:
 collecting speech information and operation information in the screen recording video.

According to one or more embodiments of the present disclosure, the method for generating the interactive record is provided in a sixth example. In the method, in a case that the behavior data includes the speech information, the generating interactive record data corresponding to the behavior data based on the behavior data includes:
 performing voiceprint recognition on the speech information to determine a speaking user corresponding to the speech information;
 performing speech recognition on the speech information to obtain a speech recognition result; and
 generating the interactive record data corresponding to the behavior data based on an association between the speaking user and the speech recognition result.

According to one or more embodiments of the present disclosure, the method for generating the interactive record is provided in a seventh example. In the method, the generating interactive record data corresponding to the behavior data based on the behavior data includes:
 generating the interactive record data corresponding to the behavior data by performing information extraction on the operation object in the operation information.

According to one or more embodiments of the present disclosure, the method for generating the interactive record is provided in an eighth example. In the method, the generating the interactive record data corresponding to the behavior data by performing information extraction on the operation object in the operation information includes:
 determining a target element in a target image corresponding to the operation information based on image recognition; and generating an interactive record corresponding to the behavior data based on the target element; where the target image includes an image corresponding to a shared document and/or an image corresponding to a shared screen.

According to one or more embodiments of the present disclosure, the method for generating the interactive record is provided in a ninth example. In the method, in a case that the multimedia data stream is a data stream generated based on a real-time interactive interface, the collecting, from a multimedia data stream, behavior data of a user represented by the multimedia data stream includes:
 collecting behavior data of each user in real time based on request information for generating the interactive record, in response to a reception of the request information.

According to one or more embodiments of the present disclosure, the method for generating the interactive record is provided in a tenth example. In the method, the collecting behavior data of a user represented by the multimedia data stream includes:
 receiving speech information of each user collected by a client; and/or receiving request information corresponding to a trigger operation, and determining operation information corresponding to the request information.

According to one or more embodiments of the present disclosure, the method for generating the interactive record is provided in an eleventh example. In the method, in a case that the behavior data includes the operation information, the determining an operation object and an operation behavior in the operation information, and generating the interactive record data based on an association relationship between the operation object and the operation behavior includes:
- acquiring a shared document and associated information corresponding to the shared document, in response to a detection of a trigger operation for sharing a document;
- determining the operation information based on the trigger operation, the shared document and the associated information, where the associated information includes a shared link of the shared document and/or a storage address of the shared document; and
- generating the interactive record data corresponding to the behavior data based on the operation information.

According to one or more embodiments of the present disclosure, the method for generating the interactive record is provided in a twelfth example. In the method, in a case that the behavior data includes the operation information, the determining an operation object and an operation behavior in the operation information, and generating the interactive record data based on an association relationship between the operation object and the operation behavior includes:
- identifying identification information in a shared screen, in response to a detection of a trigger operation for sharing a screen; determining the operation information based on the identification information, the trigger operation and a video frame of the shared screen; and generating the interactive record data corresponding to the behavior data based on the operation information, where the identification information includes a link in the shared screen.

According to one or more embodiments of the present disclosure, the method for generating the interactive record is provided in a thirteenth example. In the method, in a case that the behavior data includes the speech information, the generating interactive record data corresponding to the behavior data based on the behavior data includes:
- performing speech recognition on the speech information, and generating the interactive record data based on an obtained speech recognition result.

According to one or more embodiments of the present disclosure, the method for generating the interactive record is provided in a fourteenth example. In the method, the performing speech recognition on the speech information, and generating the interactive record data based on an obtained speech recognition result includes:
- determining a target language type of a speaking user to which the speech information belongs; and
- processing the speech information in the behavior data based on the target language type to generate the interactive record data.

According to one or more embodiments of the present disclosure, the method for generating the interactive record is provided in a fifteenth example. In the method, the determining a target language type of a speaking user to which the speech information belongs includes:
- determining the target language type based on a language type of a speaking user to which a current client belongs.

According to one or more embodiments of the present disclosure, the method for generating the interactive record is provided in a sixteenth example. In the method, the language type of the speaking user to which the current client belongs is determined by at least one of:
- determining the language type of the user by performing language type recognition on the speech information in the behavior data;
- acquiring a language type preset on the client; and
- acquiring a login address of the client, and determining the language type corresponding to the user based on the login address.

According to one or more embodiments of the present disclosure, the method for generating the interactive record is provided in a seventeenth example. The method further includes:
- acquiring historical interactive record data, in response to a detection of a new user;
- and pushing the historical interactive record data to a client of the new user.

According to one or more embodiments of the present disclosure, the method for generating the interactive record is provided in an eighteenth example. In the method, the acquiring historical interactive record data, in response to a detection of a new user; and pushing the historical interactive record data to a client of the new user includes:
- determining a target language type of the new user, in response to the detection of the new user;
- acquiring the historical interactive record data; and
- converting the historical interactive record data into interactive record data of a same type as the target language type of the new user, and sending the converted interactive record data to the client corresponding to the new user.

According to one or more embodiments of the present disclosure, the method for generating the interactive record is provided in a nineteenth example. The method further includes:
- sending the interactive record data to a target client, and displaying the interactive record data on the target client.

According to one or more embodiments of the present disclosure, the method for generating the interactive record is provided in a twentieth example. In the method, the displaying the interactive record data on the target client includes:
- displaying the interactive record data in a target area.

According to one or more embodiments of the present disclosure, the method for generating the interactive record is provided in a twenty-first example. In the method, the target area is located at a periphery of a multimedia interface, or is located at a blank area in the video interface.

According to one or more embodiments of the present disclosure, the method for generating the interactive record is provided in a twenty-second example. In the method, the displaying the interactive record data in a target area includes:
- displaying the interactive record data in the target area in a form of a bullet screen;
- where the target area includes a blank area in a video interface.

According to one or more embodiments of the present disclosure, the method for generating the interactive record is provided in a twenty-third example. In the method, the blank area is updated in real time based on image information displayed on a display interface.

According to one or more embodiments of the present disclosure, the method for generating the interactive record is provided in a twenty-fourth example. The method further includes:

storing the interactive record data in a target location.

According to one or more embodiments of the present disclosure, the method for generating the interactive record is provided in a twenty-fifth example. In the method, the storing the interactive record data in a target location includes:

storing the interactive record data locally; and/or
storing the interactive record data in a cloud, and generating a storage link corresponding to the interactive record data, to acquire the interactive record data based on the storage link.

According to one or more embodiments of the present disclosure, the method for generating the interactive record is provided in a twenty-sixth example. In the method, the multimedia data stream includes a video data stream generated based on a multimedia conference, a video data stream generated based on a live video broadcast, or a video data stream generated during a group chat.

According to one or more embodiments of the present disclosure, an apparatus for generating an interactive record is provided in a twenty-seventh example. The apparatus includes a behavior data collection module and an interactive record data generation module.

The behavior data collection module is configured to collect, from a multimedia data stream, behavior data of a user represented by the multimedia data stream, where the behavior data includes speech information and/or operation information.

The interactive record data generation module is configured to generate interactive record data corresponding to the behavior data, based on the behavior data.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for generating an interactive record, wherein at least two users that are located remotely are participants in a multimedia conference, a live video broadcast, or a group chat via respective client devices, the method comprising:

collecting, from a multimedia data stream, behavior data of one of the at least two users represented by the multimedia data stream, wherein the behavior data comprises operation information;

generating interactive record data corresponding to the behavior data, based on the behavior data, wherein the interactive record data is an interactive record text corresponding to the behavior data, and the interactive record data comprises a narrative description of an operation being performed in response to the operation information in addition to displaying the operation information; and sending the interactive record data to a target client, to display the interactive record data on the target client, wherein both the operation information and the narrative description of the operation are displayed at the target client.

2. The method according to claim 1, wherein the generating interactive record data corresponding to the behavior data comprises:

determining an operation object and an operation behavior in the operation information; and generating the interactive record data based on an association relationship between the operation object and the operation behavior.

3. The method according to claim 2, wherein in a case that the operation information comprises document sharing operation information, the operation object comprises a shared document, the operation behavior comprises a behavior to share a document, and the generating interactive record data corresponding to the behavior data based on the behavior data comprises:

determining a document sharing address and/or a storage address associated with the shared document, based on the shared document; and generating the interactive record data based on the shared address and/or the storage address.

4. The method according to claim 2, wherein in a case that the operation information comprises screen sharing operation information, the operation object comprises a shared screen, the operation behavior comprises a behavior to share the shared screen, and the generating interactive record data corresponding to the behavior data based on the behavior data comprises:

determining identification information in the shared screen based on the shared screen; and generating the interactive record data based on the identification information.

5. The method according to claim 1, wherein the behavior data further comprises speech information, and the generating interactive record data corresponding to the behavior data based on the behavior data comprises:

performing voiceprint recognition on the speech information, to determine a speaking user corresponding to the speech information;

performing speech recognition on the speech information, to obtain a speech recognition result; and generating the interactive record data corresponding to the behavior data, based on an association between the speaking user and the speech recognition result.

6. The method according to claim 2, wherein the collecting behavior data of a user represented by the multimedia data stream comprises:
collecting speech information and operation information in a screen recording video.

7. The method according to claim 6, wherein the generating interactive record data corresponding to the behavior data based on the behavior data comprises:
generating the interactive record data corresponding to the behavior data by performing information extraction on the operation object in the operation information.

8. The method according to claim 2, wherein in a case that the multimedia data stream is a data stream generated based on a real-time interactive interface, the collecting, from a multimedia data stream, behavior data of a user represented by the multimedia data stream comprises:
collecting behavior data of each user based on request information for generating an interactive record, in response to a reception of the request information.

9. The method according to claim 8, wherein the behavior data further comprises speech information, and the collecting behavior data of a user represented by the multimedia data stream comprises at least one of:
receiving speech information of each user collected by a client; and
receiving request information corresponding to a trigger operation, and determining operation information corresponding to the request information.

10. The method according to claim 8, wherein in a case that the behavior data comprises the operation information, the determining an operation object and an operation behavior in the operation information, and generating the interactive record data based on an association relationship between the operation object and the operation behavior comprises:
acquiring a shared document and associated information corresponding to the shared document, in response to a detection of a trigger operation for sharing a document;
determining the operation information based on the trigger operation, the shared document and the associated information, wherein the associated information comprises a shared link of the shared document and/or a storage address of the shared document; and
generating the interactive record data corresponding to the behavior data based on the operation information.

11. The method according to claim 8, wherein in a case that the behavior data comprises the operation information, the determining an operation object and an operation behavior in the operation information, and generating the interactive record data based on an association relationship between the operation object and the operation behavior comprises:
identifying identification information in a shared screen, in response to a detection of a trigger operation for sharing a screen;
determining the operation information based on the identification information, the trigger operation and a video frame of the shared screen; and
generating the interactive record data corresponding to the behavior data based on the operation information;
wherein the identification information comprises a link in the shared screen.

12. The method according to claim 1, wherein the behavior data further comprises speech information, the generating interactive record data corresponding to the behavior data based on the behavior data comprises:
performing speech recognition on the speech information; and generating the interactive record data based on an obtained speech recognition result.

13. The method according to claim 12, wherein the performing speech recognition on the speech information, and generating the interactive record data based on an obtained speech recognition result comprises:
determining a target language type of a speaking user to which the speech information belongs; and
processing the speech information in the behavior data based on the target language type, to generate the interactive record data.

14. The method according to claim 13, wherein the determining a target language type of a speaking user to which the speech information belongs comprises:
determining the target language type based on a language type of a speaking user to which a current client belongs.

15. The method according to claim 14, wherein the language type of the speaking user to which the current client belongs is determined by at least one of:
determining the language type of the user by performing language type recognition on the speech information in the behavior data;
acquiring a language type preset on the client; and
acquiring a login address of the client, and determining the language type corresponding to the user based on the login address.

16. The method according to claim 1, further comprising:
acquiring historical interactive record data, in response to a detection of a new user; and pushing the historical interactive record data to a client of the new user.

17. The method according to claim 16, wherein the acquiring historical interactive record data, in response to a detection of a new user; and pushing the historical interactive record data to a client of the new user comprises:
determining a target language type of the new user, in response to the detection of the new user;
acquiring the historical interactive record data; and
converting the historical interactive record data into interactive record data of a same type as the target language type of the new user, and sending the converted interactive record data to the client corresponding to the new user.

18. The method according to claim 1, wherein the displaying the interactive record data on the target client comprises:
displaying the interactive record data in a target area.

19. The method according to claim 18, wherein the target area is located at a periphery of a multimedia interface, or is located at a blank area in the multimedia interface.

20. The method according to claim 18, wherein the displaying the interactive record data in a target area comprises:
displaying the interactive record data in the target area in a form of bullet screen,
wherein the target area comprises a blank area in a multimedia interface.

21. The method according to claim 19, wherein the blank area is updated in real time based on image information displayed on a display interface.

22. The method according to claim 1, further comprising:
storing the interactive record data in a target location, and wherein the storing the interactive record data in a target location comprises:

storing the interactive record data locally; and/or storing the interactive record data in a cloud, and generating a storage link corresponding to the interactive record data, to acquire the interactive record data based on the storage link.

23. The method according to claim 1, wherein the multimedia data stream comprises a video data stream generated based on the multimedia conference, a video data stream generated based on the live video broadcast, or a video data stream generated during the group chat.

24. The method according to claim 7, wherein the generating the interactive record data corresponding to the behavior data by performing information extraction on the operation object in the operation information comprises:

determining a target element in a target image corresponding to the operation information, based on image recognition; and generating an interactive record corresponding to the behavior data based on the target element, wherein the target image comprises an image corresponding to a shared document and/or an image corresponding to a shared screen.

25. An electronic device, comprising:

one or more processors; and a storage apparatus configured to store one or more programs, wherein the one or more programs, when executed by the one or more processors, cause the one or more processors to in a case that at least two users that are located remotely are participants in a video conference, a live video broadcast, or a group chat via respective client devices, collect, from a multimedia data stream, behavior data of one of at least two users represented by the multimedia data stream, wherein the behavior data comprises operation information;

generate interactive record data corresponding to the behavior data, based on the behavior data, wherein the interactive record data is an interactive record text corresponding to the behavior data, and the interactive record data comprises a narrative description of an operation being performed in response to the operation information in addition to displaying the operation information; and send the interactive record data to a target client, to display the interactive record data on the target client, wherein both the operation information and the narrative description of the operation are displayed at the target client.

26. A non-transitory storage medium containing computer executable instructions, wherein the computer executable instructions, when executed by a computer processor, cause the computer processor to in a case that at least two users that are located remotely are participants in a video conference, a live video broadcast, or a group chat via respective client devices, collect, from a multimedia data stream, behavior data of one of at least two users represented by the multimedia data stream, wherein the behavior data comprises operation information;

generate interactive record data corresponding to the behavior data, based on the behavior data, wherein the interactive record data is an interactive record text corresponding to the behavior data, and the interactive record data comprises a narrative description of an operation being performed in response to the operation information in addition to displaying the operation information; and send the interactive record data to a target client, to display the interactive record data on the target client, wherein both the operation information and the narrative description of the operation are displayed at the target client.

* * * * *